United States Patent
Calmon et al.

(10) Patent No.: US 10,817,799 B2
(45) Date of Patent: Oct. 27, 2020

(54) DATA-DRIVEN MODELS FOR IMPROVING PRODUCTS

(71) Applicant: International Business Machines Corporation, Armonk, NY (US)

(72) Inventors: Flavio du Pin Calmon, White Plains, NY (US); Richard Thomas Goodwin, Dobbs Ferry, NY (US); Ashish Jagmohan, Irvington, NY (US); Krishna Chaitanya Ratakonda, Yorktown Heights, NY (US); Aditya Vempaty, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1051 days.

(21) Appl. No.: 15/291,685

(22) Filed: Oct. 12, 2016

(65) Prior Publication Data
US 2018/0075369 A1   Mar. 15, 2018

Related U.S. Application Data

(60) Provisional application No. 62/385,336, filed on Sep. 9, 2016.

(51) Int. Cl.
*G06N 20/00* (2019.01)
*G06Q 10/06* (2012.01)

(52) U.S. Cl.
CPC ......... *G06N 20/00* (2019.01); *G06Q 10/0637* (2013.01)

(58) Field of Classification Search
CPC ........ G16C 20/00; G16C 20/10; G16C 20/20; G16C 20/30; G16C 20/70; G16C 20/80; G16C 60/00; G06Q 10/0637
See application file for complete search history.

(56) References Cited

U.S. PATENT DOCUMENTS

| | | | | |
|---|---|---|---|---|
| 7,299,245 B2 * | 11/2007 | Hunt | ...................... | G06Q 10/10 |
| 8,249,946 B2 * | 8/2012 | Froseth | ................... | G06Q 10/08 |
| | | | | 416/72 |

(Continued)

OTHER PUBLICATIONS

Arabie, Phipps et al.; Overlapping Clustering: A New Method for Product Positioning; 1981 JMR, Journal of Marketing Research; pp. 310-317. (Year: 1981).*
Schaeffer, Satu Elisa; Graph clustering; 2007; Elsevier; Computer Science Review (27-64). (Year: 2007).*
Achtert, Elke et al.; Detection and Visualization of Subspace Cluster Hierarchies; 2007; Springer-Verlag Berlin Heidelberg; DASFAA 2007, LNCS 4443; pp. 152-163. (Year: 2007).*

(Continued)

*Primary Examiner* — Stanley K. Hill
(74) *Attorney, Agent, or Firm* — Amin, Turocy & Watson, LLP

(57) ABSTRACT

Techniques for improving products based on data-driven models are provided. In one example, a system comprises a receiving component that receives product data representing information about a set of products, wherein a first product of the set of products comprises a first combination of a first set of ingredients, and wherein the product data comprises product composition data representing a composition of the first product. The system further comprises a learning component that generates product space data representing a product space that characterizes the set of products and respective degrees of similarity between members of the set of products, wherein a degree of similarity between the first product and a second product of the set of products is determined based on product distance data representing a determined distance metric resulting from a comparison of the first set of ingredients to a second set of ingredients combined to produce the second product.

20 Claims, 10 Drawing Sheets

(56) References Cited

U.S. PATENT DOCUMENTS

| | | | | |
|---|---|---|---|---|
| 8,423,323 | B2* | 4/2013 | Bonabeau | G06Q 10/06 703/1 |
| 9,483,547 | B1* | 11/2016 | Feller | G06F 16/358 |
| 9,519,694 | B2* | 12/2016 | Kamei | G06Q 10/00 |
| 9,870,550 | B2* | 1/2018 | Byron | G06Q 10/087 |
| 2005/0177280 | A1* | 8/2005 | Almstetter | B01J 19/0046 700/266 |
| 2008/0243637 | A1* | 10/2008 | Chan | G06Q 30/02 705/26.1 |
| 2008/0243815 | A1* | 10/2008 | Chan | G06Q 30/02 |
| 2008/0243817 | A1* | 10/2008 | Chan | G06Q 30/02 |
| 2008/0275727 | A1* | 11/2008 | Koo | G06Q 50/22 705/2 |
| 2014/0188566 | A1* | 7/2014 | Pinel | G06Q 30/0204 705/7.34 |
| 2015/0058065 | A1* | 2/2015 | Pinel | G06Q 10/06315 705/7.25 |
| 2015/0059438 | A1 | 3/2015 | Varshney et al. | |
| 2015/0066386 | A1 | 3/2015 | Varshney et al. | |
| 2015/0161912 | A1* | 6/2015 | Bhattacharjya | G06F 16/9024 434/127 |
| 2015/0220592 | A1 | 8/2015 | Robberechts et al. | |
| 2016/0306332 | A1* | 10/2016 | Hill | G05B 19/0426 |

OTHER PUBLICATIONS

Teng, Chun-Yuen et al.; Recipe recommendation using ingredient networks; 2011; ACM; 10 pages. (Year: 2011).*

Van Pinxteren, Youri et al.; Deriving a Recipe Similarity Measure for Recommending Healthful Meals; 2011 ACM; IUI 2011; pp. 105-114. (Year: 2011).*

Pinel, et al., "A culinary computational creativity system." Computational Creativity Research: Towards Creative Machines. Atlantis Press, 2015. 327-346, 20 pages.

Teng, et al., "Recipe recommendation using ingredient networks." Proceedings of the 4th Annual ACM Web Science Conference. ACM, 2012, 10 pages.

Mikolov, et al., "Efficient estimation of word representations in vector space." arXiv preprint arXiv:1301.3781 (2013), 12 pages.

Mikolov, et al., "Distributed representations of words and phrases and their compositionality." Advances in neural information processing systems. 2013, 9 pages.

Mikolov, et al., "Exploiting similarities among languages for machine translation." arXiv preprint arXiv:1309.4168 (2013), 10 pages.

Pennington, et al., "Glove: Global vectors for word representation." Proceedings of the Empiricial Methods in Natural Language Processing (EMNLP 2014) 12 (2014): 1532-1543, 12 pages.

* cited by examiner

| FLAVOR | INGREDIENT 1 | INGREDIENT 2 | INGREDIENT M |
|---|---|---|---|
| 1 | 20 % | 50 % | 30 % |
| 2 | 80 % | 20 % | 0 % |
| 3 | 32.5 % | 2.5 % | 65 % |

| INGRED-IENT | SOLU-BILITY | SAVORY | SWEETNESS | SALTY | ACTIVE CONCENTRATION |
|---|---|---|---|---|---|
| 1 | .20 | 1 | 2 | N | 30 % |
| 2 | .5 | 0 | 9 | N | 0 % |
| 3 | .90 | 1 | .5 | Y | 65 % |

| FLAVOR | COST | CREATION TIME | CREATOR |
|---|---|---|---|
| 1 | $1 | 1/2/95 | ALICE |
| 2 | $3 | 5/10/12 | BOB |
| 3 | $5 | 11/26/13 | EVE |

DATA-DRIVEN MODELS FOR IMPROVING PRODUCTS

BACKGROUND

The subject disclosure relates to data-driven models, and more specifically, to data-driven models for improving products.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate machine learning to provide incremental static program analysis.

According to an embodiment, a system is provided. The system can comprise a memory that stores computer executable components and a processor that executes computer executable components stored in the memory. The computer executable components can comprise a receiving component that can receive product data representing information about a set of products. A first product of the set of products can comprise a first combination of a first set of ingredients. The product data can comprise product composition data representing a composition of the first product. The computer executable components can further comprise a learning component that can generate product space data representing a product space that characterizes the set of products and respective degrees of similarity between members of the set of products. A degree of similarity between the first product and a second product of the set of products can be determined based on product distance data representing a determined distance metric resulting from a comparison of the first set of ingredients to a second set of ingredients combined to produce the second product.

In some embodiments, elements described in connection with the system can be embodied in different forms such as a computer-implemented method, a computer program product, or another form.

DESCRIPTION OF THE DRAWINGS

FIGS. 3A-3C illustrate tables that respectively provide non-limiting examples in the context of a flavor-based product of product composition data, ingredient properties data, and product metadata in accordance with one or more embodiments of the disclosed subject matter.

DETAILED DESCRIPTION

Figure 1:
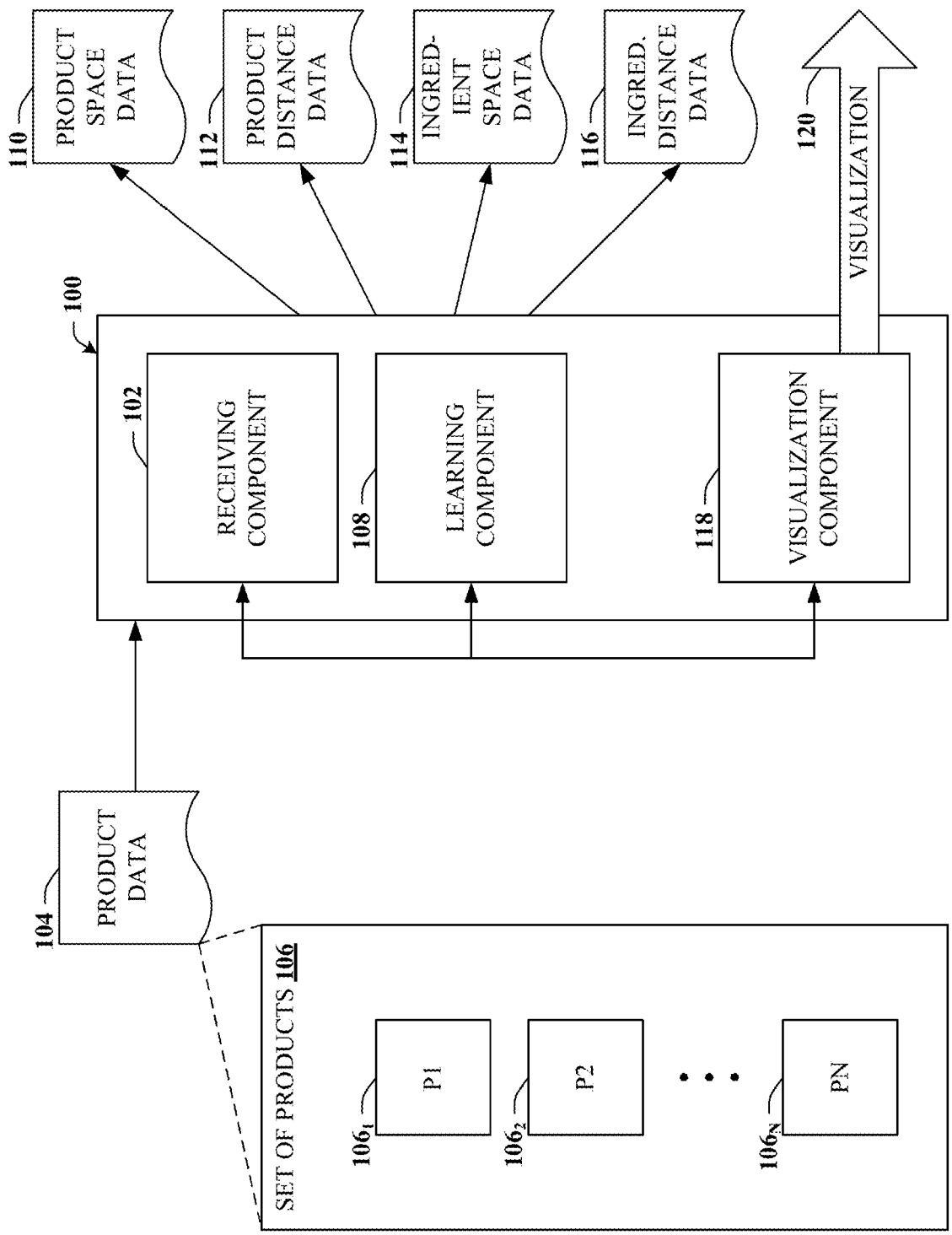
FIG. 1 illustrates a block diagram of an example, non-limiting system that can improve certain products or product domains based on a data-driven model in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

This disclosure relates in some embodiments to product creation and/or improvement by exploring the combination of different ingredients. Examples include production of food, flavor, fragrances, etc. For the sake of brevity, the disclosed subject matter is described in the context of a flavor product (e.g., flavoring) that is created by combining various ingredients. It is understood that the disclosed subject matter can apply to products other than flavor products such as food products, fragrance products, or any other suitable product, some examples of which are detailed in connection with FIG. 6. In some embodiments, suitable product domains that can benefit from the techniques disclosed herein can be products that are created or improved, at least in part, by mixing, coupling, assembling, or otherwise combining a set of constituent parts (e.g., ingredients). In some embodiments, a suitable product domain can comprise domains in which at least a portion of the constituent parts can be characterized in terms of a distance metric based on similarity and/or dissimilarity between any two of the constituent parts.

In some embodiments, for a product that eventually reaches the marketplace, several, sometimes dozens or more, of intermediate trial products are created, evaluated, and discarded after review. Consequently, as a company grows, the number of products created internally usually grows at a much faster rate than the actual consumer-facing product line.

Information about both successful and discarded (e.g., not market launched) products and their composition can be stored in databases maintained by the company. This data can be extremely valuable and rich, since these data can contain information about (i) the creative process for developing new products, (ii) what makes a product successful or not, (iii) the product space, e.g., the collection of all products that could possibly be created, and/or (iv) the ingredient space, e.g., the ingredients and their interactions to create different products.

The product space itself can be exponentially large due to the combinatorial nature of possible ingredient combinations. However, even though the product space is large, exploration of the product space is usually limited by the creative process of the experts. Experts tend to create products based on past experiences, resulting in many products (by the same expert) that occupy the same areas in the product space. Consequently, if analytical tools are not available, products tend to be "re-invented", with new trial products being similar to previous, discarded ones. This constrains the creative process of the company with similar products being re-created over time.

The disclosed subject matter can relate to a distinct approach that combines machine learning, expert feedback, and computational tools that can, e.g., (i) characterize and quantify the exponentially large product space, (ii) guide the expert in the creation of new, successful products with pre-specified goals (cost, quality, price, etc.), and/or (iii) provide managerial insight on the products developed by a company. In some embodiments, implementation of the disclosed subject matter can make the product creation process more efficient, more innovative, and/or more conducive to discovery.

In some embodiments, the disclosed subject matter can create a data-driven characterization of the product space. In some embodiments, the product space can represent a logical or mathematical representation of the set of all products that can be created with a given set of ingredients. Characterization of the product space can be given in terms of properties of the constituent parts of the products (e.g., ingredients) and other product metadata available (e.g. cost, sales information, expert evaluation, etc.). The product space can provide for a measure of similarity/dissimilarity between products, and can be used to determine which areas of the product space have been over (or under) explored. The disclosed subject matter can rely on algorithms to explore and characterize the product space, as well as guide creative process by, for example, suggesting new products or improvements to existing products. In some embodiments, such suggestions can be based on certain constraints such as achieving defined goals.

The product space can be generated by applying learning algorithms to data that includes one or more of the following information: (1) Application-dependent ingredient properties, such as chemical composition, flavor profile, solubility, cost, etc.; (2) Information about previously created products and/or, more broadly, the creative processes used by the company. Such can include, for example, ingredient compositions of all products created or tested by the company, changes to a product composition over time or across successive trials, results of bench-top tests and evaluation, a list of successful products in terms of sales, etc.; and (3) Expert feedback, such as lists of products that have been determined a priori to be similar or dissimilar, or relative ranking of different products determined through trials, or classification of a given subset of products.

Elements of the disclosed subject matter can analyze all or a portion of these data and/or can utilize such data to create both a product space and an ingredient space (which can represent a logical or mathematical representation of the set of all available ingredients). Such can be accomplished, for example, by assigning a numeric vector for each of the products, and/or, more generally, providing a measure of distance between products in terms of the distances associated with composing ingredients. In the product space, products that have similar properties in terms of composing ingredients (but not necessarily composed by the same ingredients) can be close together, whereas products that are different can be far apart. "Distances" in the product and ingredient spaces can be further adjusted by incorporating data provided by expert feedback (e.g. a new list of products or ingredients that are deemed to be similar/different).

One or more embodiments of the disclosed subject matter can create visualizations (e.g., of the product space, the ingredient space, etc.), which can then be overlaid with additional metadata such as sales, cost, creator information, time of creation, success/failure, etc.

One or more embodiments of the disclosed subject matter can also automatically describe properties of different regions of the product space. For example, for a given targeted product, properties of its neighborhood (e.g., a region of the product space) can be described. If a cluster of products that are close together can be identified, similar properties of these products in terms of their composing ingredients or other metadata can also be identified. The disclosed subject matter can allow for identifying common patterns and anti-patterns (e.g., patterns that are substantially unique to a cluster) among the cluster of selected products in the product space.

In addition, for a new product added in the product space, one or more embodiments of the disclosed subject matter can help guide the creative process by suggesting similar products (e.g., close in the product space) but with different properties, such as lower cost or a good track record of sales or any other additional targeted requirements, constraint, or goal.

Turning now to the drawings, FIG. 1 illustrates a block diagram of an example, non-limiting system 100 that can improve certain products or product domains based on a data-driven model in accordance with one or more embodiments of the disclosed subject matter. System 100 and/or the components of the system 100 or other systems disclosed herein can be employed to use hardware and/or software to solve problems that are highly technical in nature, that are not abstract, and that cannot be performed as a set of mental acts by a human. Further, some of the processes performed can be performed by specialized computers for carrying out defined tasks related to data-driven models, potentially infinitely large or unbounded product spaces, and/or machine learning techniques. System 100 and/or components of system 100 or other systems described herein can be employed to solve new problems that arise through advancements in technology, computer networks, the Internet, and the like. System 100 or other systems detailed herein can provide technical improvements to modeling of product spaces in general, and more specifically can provide a useful and feasible mechanism to characterize the product space in a manner that can facilitate new product development, improving products, and so forth.

System 100 can comprise a processor and a memory that stores executable instructions that, when executed by the processor, facilitate performance of operations. Examples of said processor and memory, as well as other suitable computer or computing-based elements, can be found with reference to FIG. 7, and can be used in connection with implementing one or more of the systems or components shown and described in connection with FIG. 1 or other figures disclosed herein.

In this example, system 100 can include receiving component 102 that can receive product data 104. Product data 104 can represent information about a set of products 106. As illustrated, set of products 106 can comprise substantially any number, N, of products, which are labeled here as products $106_1$-$106_N$. Elements labeled herein with subscripts (e.g., products $106_1$-$106_N$) can, for purposes of brevity, be referred to, either individually or collectively without use of the subscripts. Hence, appropriate subscripts are generally employed only when instructive or convenient to highlight various distinctions or to better impart the disclosed concepts. In some embodiments, a product 106 can be composed of a set of ingredients that are combined in some fashion (e.g., mixed, coupled, fastened, etc.) to form the product 106. In some embodiments, the product 106 can be consumable such as a food or flavor.

Figure 2B:
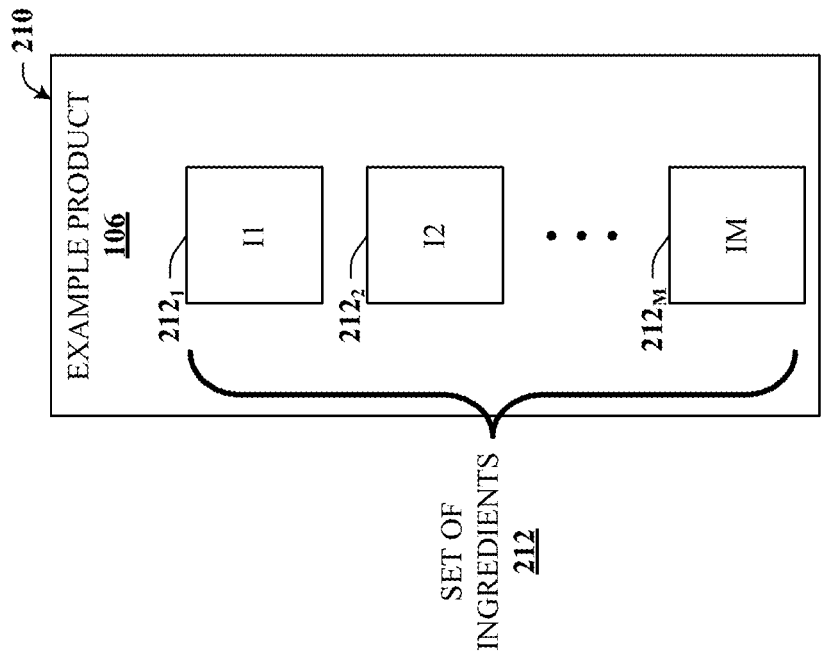
FIG. 2B illustrates a block diagram of a non-limiting example of a product in accordance with certain embodiments of the disclosed subject matter.
Figure 2A:
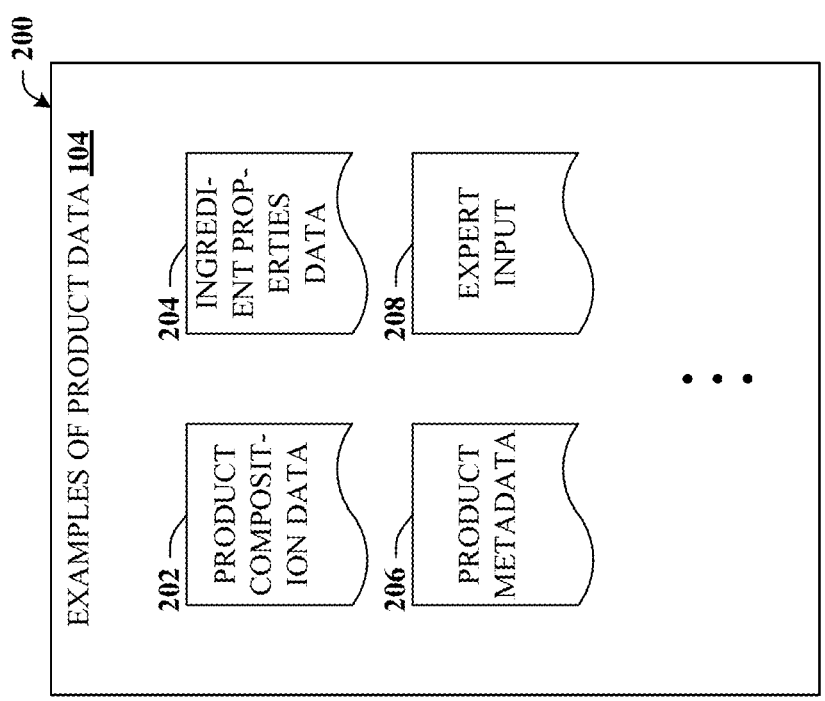
FIG. 2A illustrates a block diagram of a non-limiting example of product data in accordance with certain embodiments of the disclosed subject matter.

While still referring to FIG. 1, but turning now as well to FIGS. 2A and 2B, various examples are provided. For example, FIG. 2A illustrates block diagram 200 of a non-limiting example of a product data 104 in accordance with certain embodiments of the disclosed subject matter. Repetitive description of like elements employed in other embodiments described herein is omitted for sake of brevity. As noted previously, product data 104 can represent information about a set of products 106. For example, product data 104 can be or can comprise product composition data 202. Product composition data 202 can represent a composition of a product 106, examples of which can be found with reference to FIG. 3A. In some embodiments, product composition data 202 can comprise a list or inventory of composing ingredients as well as an amount or representative proportion of each ingredient.

In some embodiments, product data 104 can comprise ingredient properties data 204. Ingredient properties data 204 can represent information relating to various properties of an ingredient. For example, ingredient properties data can describe a chemical composition of an ingredient of a product 106 as well as a listing of chemical characteristics (e.g., solubility, valence, etc.), a flavor profile of the ingredient, an olfactory (scent) profile of the ingredient, an aural (sound) profile of the ingredient, a visual profile of the ingredient, or the like. An example of ingredient properties data 204 can be found in connection with FIG. 3B, illustrating an example flavor profile.

In some embodiments, product data 104 can comprise product metadata 206. Product metadata 206 can represent information about the product 106. For example, product metadata 206 can relate to a cost of the product, sales information data representing sales of the product, creation time data representing a time or date of creation of the product, an identity of a creator of the product, success/failure data representing an indication of whether the product was determined to pass market testing, and so on. An example of product metadata 206 can be found in connection with FIG. 3C.

In some embodiments, product data 104 can comprise expert input 208. Expert input 208 can represent a priori information, e.g., established by an expert, that can be used to adjust the product space (e.g., certain products 106 and/or certain corresponding ingredients are deemed to be similar/dissimilar, a relative ranking of different products determined through trials or the like, a classification of a given subset of products, etc.). In some embodiments, expert input 208 need not be a priori, but instead can represent suitable feedback from the expert. In some embodiments, the feedback can be information generated by an electronic entity and/or retrieved from a storage repository.

FIG. 2B illustrates block diagram 210 of a non-limiting example of a product 106 in accordance with certain embodiments of the disclosed subject matter. Repetitive description of like elements employed in other embodiments described herein is omitted for sake of brevity. Product 106 can be comprised of a set of ingredients 212. Set of ingredients 212 can comprise substantially any number, M, of ingredients $212_1$-$212_M$. Set of ingredients 212 can represent ingredients used in the creation of product 106 (e.g., a recipe) or can represent the ingredients that remain after creation of product 106 (e.g., product composition).

It is understood that products 106 can differ from one another based on a number and type of ingredients 212 as well as based on constituent amounts of a given ingredient. For example, a first product (e.g., product $106_1$) can comprise a first combination of a first set of ingredients 212, whereas a second product (e.g., product $106_2$) can comprise a second combination of a second set of ingredients 212. The first and second product may differ based on the first set of ingredients 212 being different from the second set of ingredients 212, or may differ even when the first and second sets of ingredients 212 are the same based on varying the representative amounts or concentrations of the ingredients 212.

With reference now to FIGS. 3A-3C, various tables 300, 310, and 320 are provided. Tables 300, 310, and 320 respectively provide non-limiting examples in the context of a flavor-based product 106 of product composition data 202, ingredient properties data 204, and product metadata 206 in accordance with one or more embodiments of the disclosed subject matter. Repetitive description of like elements employed in other embodiments described herein is omitted for sake of brevity.

Still referring to FIG. 1, system 100 can further comprise learning component 108. As detailed previously, receiving component 102 can receive product data 104, which can be employed by learning component 108. For example, learning component 108 can generate product space data 110 based on product data 104. Product space data 110 can represent a product space that characterizes the set of products 106. In some embodiments, the product space can be a mathematical or logical representation of a space for all possible products that can be composed of a bounded or unbounded collection of ingredients.

The product space can characterize respective degrees of similarity between members of the set of products 106. For example, a degree of similarity between a first product (e.g., product $106_1$) and a second product (e.g., product $106_2$) can be determined based on product distance data 112. Product distance data 112 can represent a determined distance (or position within the product space) metric resulting from a comparison of the first set of ingredients 212 (e.g., ingredients 212 of product $106_1$) to a second set of ingredients 212 combined to produce the second product (e.g., product $106_2$). In other words, product distance data 112 can represent the distance (e.g., a degree of similarity) between any two products within the product space, as determined by learning component 108

In some embodiments, learning component 108 can generate ingredient space data 114. Ingredient space data 114 can represent an ingredient space that can characterize all or a portion of the sets of ingredients 212 that are used to produce the set of products 106. The ingredient space can further characterize respective degrees of similarity between ingredients 212. For example, a degree of similarity between a first ingredient (e.g., ingredient $212_1$) and a second ingredient (e.g., ingredient $212_2$) can be determined based on ingredient distance data 116. Ingredient distance data 116 can represent a determined distance (or position within the ingredient space) metric resulting from a comparison of the first ingredient $212_1$ to the second ingredient $212_2$. In other words, ingredient distance data 116 can represent the distance (e.g., a degree of similarity) between any two ingredients 212 within the ingredient space, as determined by learning component 108. Examples for determining product distance data 112 and ingredient distance data 116 can be found in connection with FIG. 5.

In some embodiments, system 100 can further comprise visualization component 118. Visualization component 118 can present a visualization 120 of the product space and/or product space data 110. In some embodiments, visualization component 118 can present a visualization 120 of the ingredient space and/or ingredient space data 114. Non-limiting examples of visualization 120 can be found with respect to FIGS. 4A and 4B.

Figure 4A:
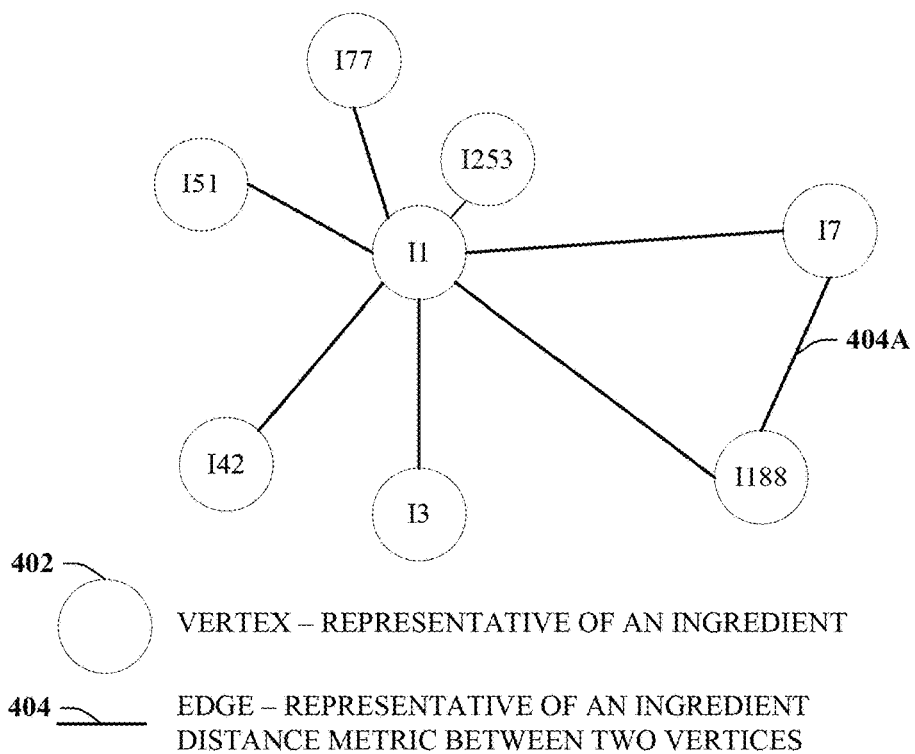
FIG. 4A illustrates a first visualization of a non-limiting example graphical characterization of the ingredient space in accordance with one or more embodiments of the disclosed subject matter.

FIG. 4A illustrates visualization 400. Visualization 400 illustrates a non-limiting example graphical characterization of the ingredient space in accordance with one or more embodiments of the disclosed subject matter. Repetitive description of like elements employed in other embodiments described herein is omitted for sake of brevity. Ingredient space data 114 can be visualized as the ingredient space with a set of vertices 402 representative of ingredients (e.g., ingredient 212) and a set of edges 404 representative of an ingredient distance metric (e.g., ingredient distance data 116) between two vertices 402.

In this example, the ingredient distance metric is represented by a length of the corresponding edge 404, although it is appreciated that other representations are contemplated. For example, edges 404 can represent a distance metric based on line thickness or the like (e.g., see FIG. 4B). In some embodiments, distance metrics can be described in the context of a position within the associated space (e.g., a location instead of a distance or thickness). In some embodiments, as here, visualization 400 can depict a first product and a second product as vertices 402 of a graph that are connected by an edge 404 representing the determined distance metric. In some embodiments, visualization 400 can depict the determined distance metric as a numeric vector.

In this example, visualization 400 pivots on a particular ingredient (e.g., ingredient $212_1$), denoted here as "I1" (e.g., ingredient one). Thus, visualization 400 illustrates the first ingredient in the ingredient space (e.g., "I1") and other ingredients (e.g., "I3", "I7", "I42", "I51", "I77", "I188", and "I253") that have been determined to be similar to the first ingredient. The second ingredient in the ingredient space (e.g., "I2") is not depicted as "I2" is not similar (e.g., is dissimilar) to "I1", which can be determined by an ingredient distance between I1 and 12 being greater than a similarity threshold. Hence, "I2" and other ingredients are not depicted in visualization 400 but can exist in other regions of the ingredient space.

Because visualization 400, in this example, pivots on "I1", other vertices 402 generally have only one edge 404 that connects to "I1". However, in some embodiments, distances between vertices 402 other than "I1" can be illustrated as well, an example of which can be found at reference numeral 404A. Such can be useful to provide additional information as well as in cases where the visualization pivots on a region of the ingredient space instead of on a particular vertex 402 of the ingredient space.

Figure 4B:
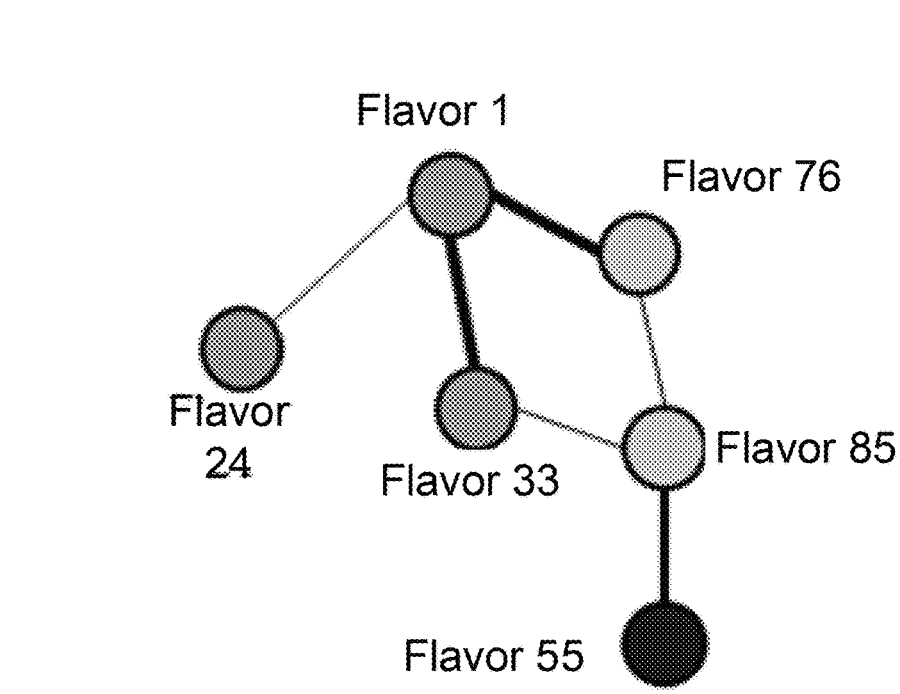
FIG. 4B illustrates a second visualization that illustrates a non-limiting example graphical characterization of the product space in accordance with one or more embodiments of the disclosed subject matter.

FIG. 4B illustrates visualization 410. Visualization 410 illustrates a non-limiting example graphical characterization of the product space in accordance with one or more embodiments of the disclosed subject matter. Repetitive description of like elements employed in other embodiments described herein is omitted for sake of brevity. Product space data 110 can be visualized as the product space with a set of vertices 412 representative of products (e.g., set of product 106) and a set of edges 414 representative of a product distance metric (e.g., product distance data 112) between two vertices 412.

Visualization 410 provides an example of pivoting on a region of space rather than on a particular vertex. Visualization 410 also provides an example of using line weight or thickness (e.g., instead of line length, as with FIG. 4A) to represent the product distance metric. For example, Flavor 1 is more similar to Flavor 33 than to Flavor 24 as represented by line weights of the associated edges 414. In some embodiments, visualizations 120 presented by visualization component 118 (e.g., visualizations 400, 410) can be clustered using spectral clustering algorithms and visualized with standard tools. Various other information (e.g., product metadata 206) can be overlaid on the visualization. For example, the fill color of vertices 412 can represent cost information, creator information, etc. Such overlays can also include text, hover text, data links, pop-ups or any other suitable indicia.

Figure 5:
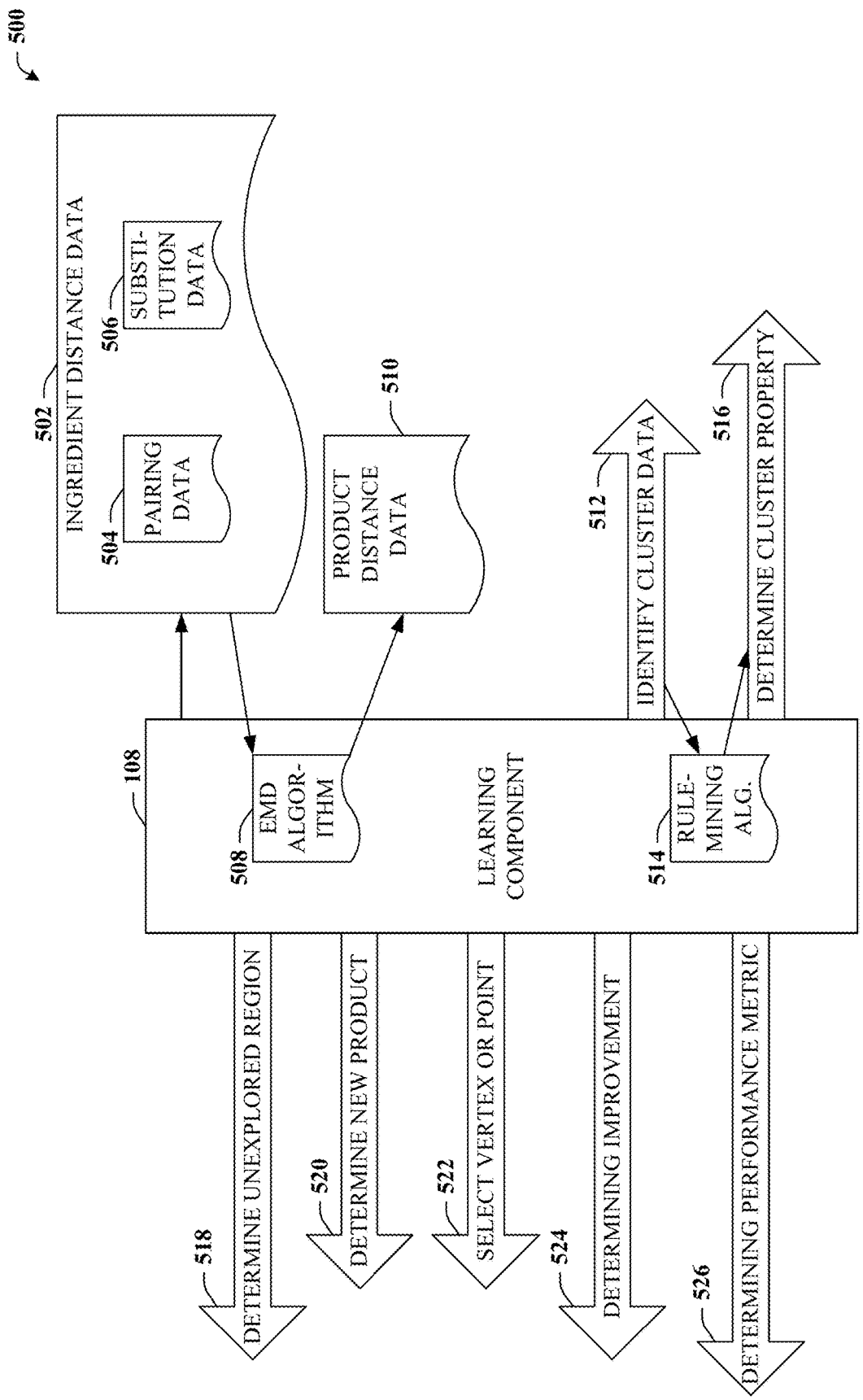
FIG. 5 illustrates a block diagram of an example, non-limiting system that illustrates a non-limiting example of additional aspects or elements of the learning component in accordance with one or more embodiments of the disclosed subject matter.

Turning now to FIG. 5, system 500 is depicted. System 500 illustrates a non-limiting example of additional aspects or elements of learning component 108 in accordance with one or more embodiments of the disclosed subject matter. Repetitive description of like elements employed in other embodiments described herein is omitted for sake of brevity.

In some embodiments, learning component 108 can effectively combine all or a portion of information about the products produced by a company or other entity (e.g., product composition data 202), properties of the composing ingredients (e.g., ingredient properties data 204), and product metadata (e.g., product metadata 206) to produce characterizations of the product and ingredient spaces. Such characterizations can further be adjusted based on expert input (e.g., expert input 208).

These characterizations can include a computed similarity between different products and/or ingredients. For example, given a set of target products, the distance between certain products and/or their positions in the product space can be determined. The distances and/or positions of the target products in the product space can be used to visualize the space, which can be overlaid with metadata such as cost, time, sales, success/failure, etc.

The number of target products may be of the order of thousands or tens of thousands or more. Thus, the disclosed subject matter can use algorithms for identifying clusters of products, and use rule-learning algorithms for explaining what factors account for similarity/dissimilarity in different regions of the product space. The disclosed subject matter can also suggest new products with desired properties. In some embodiments, such can be accomplished by exploring the product space. Managerial insight and/or performance metric can also be provided, for example, in terms of performance of product creators (e.g., how effectively the entire space is being explored).

In other words, the disclosed subject matter can in some embodiments provide for simultaneous, data-driven analysis of product data, ingredient information, and metadata for creating a product space in order to facilitate various improvements to products. Further, expert input can be integrated, e.g., for adjusting the product space. Still further, automated exploration of the product space can be provided. For instance, in order to identify groupings of products, analyze properties of different regions of the product space, suggest new products or improvements to products, and provide managerial insights and/or performance analyses.

As examples of the above, and still referring to FIG. 5, in some embodiments, learning component 108 can determine pairing data 504. Pairing data 504 can represent a count of a number of times a first ingredient (e.g., ingredient $212_1$) and a second ingredient (e.g., ingredient $212_2$) are part of a product of set of products 106. In other words, pairing data 504 can represent a count of the number of co-occurrences of ingredients in products to determine pairing (e.g., tomato and basil appear together frequently, and so are deemed to have stronger pairing).

In some embodiments, learning component 108 can determine substitution data 506. Substitution data 506 can represent an indication that a third ingredient is substitute for a fourth ingredient. For example, learning component 108 may determine that sugar and an artificial sweetener are substitutes for one another. In some embodiments, substitution data 506 can be determined based on product composition data 202, ingredient properties data 204, and/or expert input 208.

In some embodiments, learning component 108 can further determine ingredient distance data 502, which can be substantially similar to ingredient distance data 116. Determination of ingredient distance data 502 can rely on one or both pairing data 504 or substitution data 506. For example, a first determined distance between the first ingredient and the second ingredient can be attained based on pairing data 504. Additionally, or alternatively, a second determined distance between the third ingredient and the fourth ingredient can be attained based on substitution data 506. In other words, a distance value (e.g., ingredient distance data 502) defined for each pair of ingredients can be defined based on how strongly ingredients are pairs or substitutes. Ingredients that are pairs or substitutes (e.g., a degree of similarity) tend to have a low ingredient distance, whereas ingredients that are not pairs (within a threshold) or substitutes tend to have a high ingredient distance (e.g., are dissimilar). As noted previously, this ingredient distance data 502 can be adjusted based on expert input 208.

In some embodiments, learning component 108 can determine product distance data 112 (e.g., a distance between a first product $106_1$ and a second product $106_2$) and/or product distance data 510 based on a minimum cost of transforming the first set of ingredients 212 (composing first product $106_1$) to the second set of ingredients 212 (composing second product $106_2$). In some embodiments, this minimum cost can be determined based on an earth mover's distance (EMD) solution or algorithm 508 that is applied to the ingredient distance data 502 corresponding to the first set of ingredients 212 and/or the second set of ingredients 212. In other words, given the distance between ingredients, ingredient distance between products can be determined using an EMD model. The EMD solution can, e.g., model the ingredient distance as a cost-flow minimization problem. The EMD solution can correspond to a linear program that models the minimum cost of transforming one product into another product by changing each ingredient of the product.

In some embodiments, learning component 108 can determine cluster property data, denoted herein as reference numeral 516. For example, learning component 108 can identify, within the product space, a cluster of products representing a subset of the set of products 106 that are similar based on product distance data 112, denoted herein as reference numeral 512. Learning component 108 can determine the cluster property data in response to a rule-mining algorithm 514 applied to target data. In some embodiments, the target data can be product metadata 206. In some embodiments, the target data can be ingredient properties data 204. In some embodiments, the cluster property data can represent a property that is similar amongst the cluster of products. In other words, for given clusters on the graph, rule-mining algorithms can be used on the metadata and ingredient information of the products within one cluster to determine similar features between these products.

In some embodiments, learning component 108 can determine a new product, denoted herein by reference numeral 520. For example, learning component 108 can determine, based on product distance data 112, that a region of the product space is sufficiently unexplored, denoted herein by reference numeral 518. Learning component 108 can determine the new product in response to combination data representing a combination of ingredients of a product, of the set of products, that is represented by a point (or vertex) of the region. In other words, centrality measures can be assigned to different nodes in order to identify poorly connected products. These products, in turn, can correspond to unexplored regions of the space. By combining ingredients in these nodes, suggestions for new products can be generated.

In some embodiments, learning component 108 can determine an improvement to a product of the set of products 106, denoted herein by reference numeral 524. For example, learning component 108 can select a first point (or vertex), denoted herein by reference numeral 522. The first point can represent the product and can be in a targeted region of the product space. Learning component 108 can determine the improvement in response to examining ingredients of a related product represented by a second point in the region. Said differently, for example, a product created by an expert can be added to the graph (product space), and neighboring products can provide insight on how to improve the current product. For example, a similar product with lower cost may have been created in the past, or products near the new one might have low historic sales, suggesting other points or vertices should be searched.

In some embodiments, learning component 108 can determine a performance metric, denoted herein by reference numeral 526. The performance metric can be determined, e.g., based on product distance data 112. For instance, consider the concept of using the performance metric to provide managerial insight. Insight on how flavorists (or other product creators) are performing can be provided by analyzing the position of their created products on the graph. Performance can be measured not only in terms of number of products created, but how these products span the product space (graph), and the success of the flavorist's products. The region in the product space where the flavorist is typically successful can also be identified.

Figure 6:
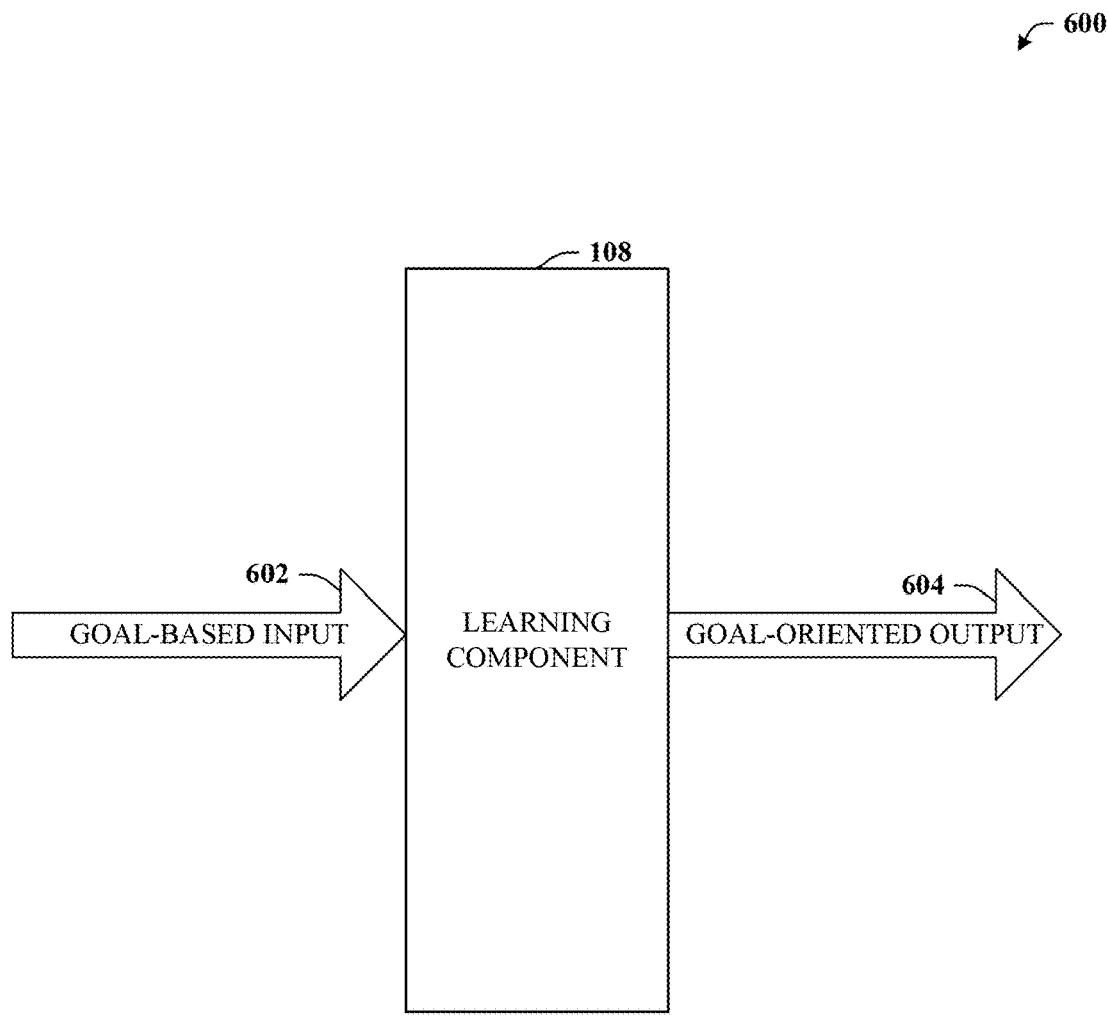
FIG. 6 illustrates a block diagram of an example non-limiting system that can provide for goal-oriented output in accordance with certain embodiments of the disclosed subject matter.

With reference now to FIG. 6, system 600 is provided. System 600 illustrates a block diagram of non-limiting system that can provide for goal-oriented output in accordance with certain embodiments of the disclosed subject matter. Repetitive description of like elements employed in other embodiments described herein is omitted for sake of brevity.

For example, learning component 108 can generate goal-oriented output 604, which can be in the form of a suggestion that is determined or inferred in accordance with the disclosed subject matter. In some embodiments, learning component 108 can generate goal-oriented output 604 based on goal-based input 602.

It is understood that while the examples provided herein have generally been in the context of a flavor-based product, other types of products are contemplated as well. For example, products can relate to substantially any creative domain. Art-based products such as movies or other video products, music or other audio products, artwork or design products, building product, apparel products, jewelry products, accessory products represent but a few.

For example, consider a movie product (e.g., product 106) in which various roles are to be filled by actors (e.g., ingredients 212). The distance metric can be determined based on a count of the number of times two actors have appeared together in other productions. Similarity/dissimilarity of actors can be gauged by this distance metric (or suitable expert input 208), which can be utilized to facilitate or improve casting as one example. As another example, the movie product can be examined in the context of having various plot points or dialog elements that can be fed into the system as ingredients in order to facilitate improved plot or dialog. In a similar manner, such concepts can be extended to many other domains such as improving aesthetic appeal of products (e.g., art or design), durability, cost, or substantially any other quantifiable metric. Furthermore, specific goals can be input to provide specific solutions.

As one example, goal-oriented output 604 can represent a solution to the goal-based input 602. In some embodiments, goal-based input 602 can comprise, e.g., determine a product that is a high-margin product, that appeals to X % of a certain demographic group, can be sourced using raw materials Y, labor from location Z, and fabricated within N weeks. Based on the aforementioned input (e.g., goals), learning component 108 can generate an appropriate goal-oriented output 604.

As another example, goal-oriented output 604 can represent an improvement. For instance, goal-based input 602 can comprise a request to modify a product (e.g., modify a recipe, shape, color scheme, etc.) to increase the appeal to a different demographic group or market segment.

As another example, a machine learning system (e.g., learning component 108) can be utilized with the goal of increasing ancillary sales within a store. Department and grocery stores benefit by having customers walk up and down every aisle since this increases amount of purchases including impulse purchases. The system can design and/or identify most popular recipes and provide ingredient placement information to a merchant as well as directions to a customer to increase navigation throughout the store including passing high margin impulse items.

As another example, learning component 108 can be utilized to create a library of ingredients for a product or service and identify substitute elements along with employment of a real-time pricing and sourcing model to facilitate creation of a uniform product while employing substitutes due to supply shortages or price spikes. Such can also be used in connection with other product modifications and/or demographic information. For example, learning component 108 can be utilized to determine substitutes with slight variance to modify products in different venues to improve customer satisfaction across different demographic groups (e.g., Japanese customers for soda A might prefer sweetener C versus sweetener B, which is preferred by Europeans).

As another example, learning component 108 can be utilized to improve next generation product releases based on real-time learned customer feedback and sales data.

As another example, learning component 108 can be utilized to generate a revenue model that uses the foregoing product development system to perform a utility-based analysis to analyze existing products, trends, sales data, profitability, available resources, risks, product life cycle, etc., to develop and/or modify product development to achieve short-term and long-term corporate goals.

As another example, learning component 108 can be utilized to generate a customer satisfaction model that provides for product development that optimizes customer satisfaction, brand recognition, sustainability, etc.

In some embodiments, subject matter detailed herein can be implemented by a mobile application (app) that executes on a mobile device.

Figure 7:
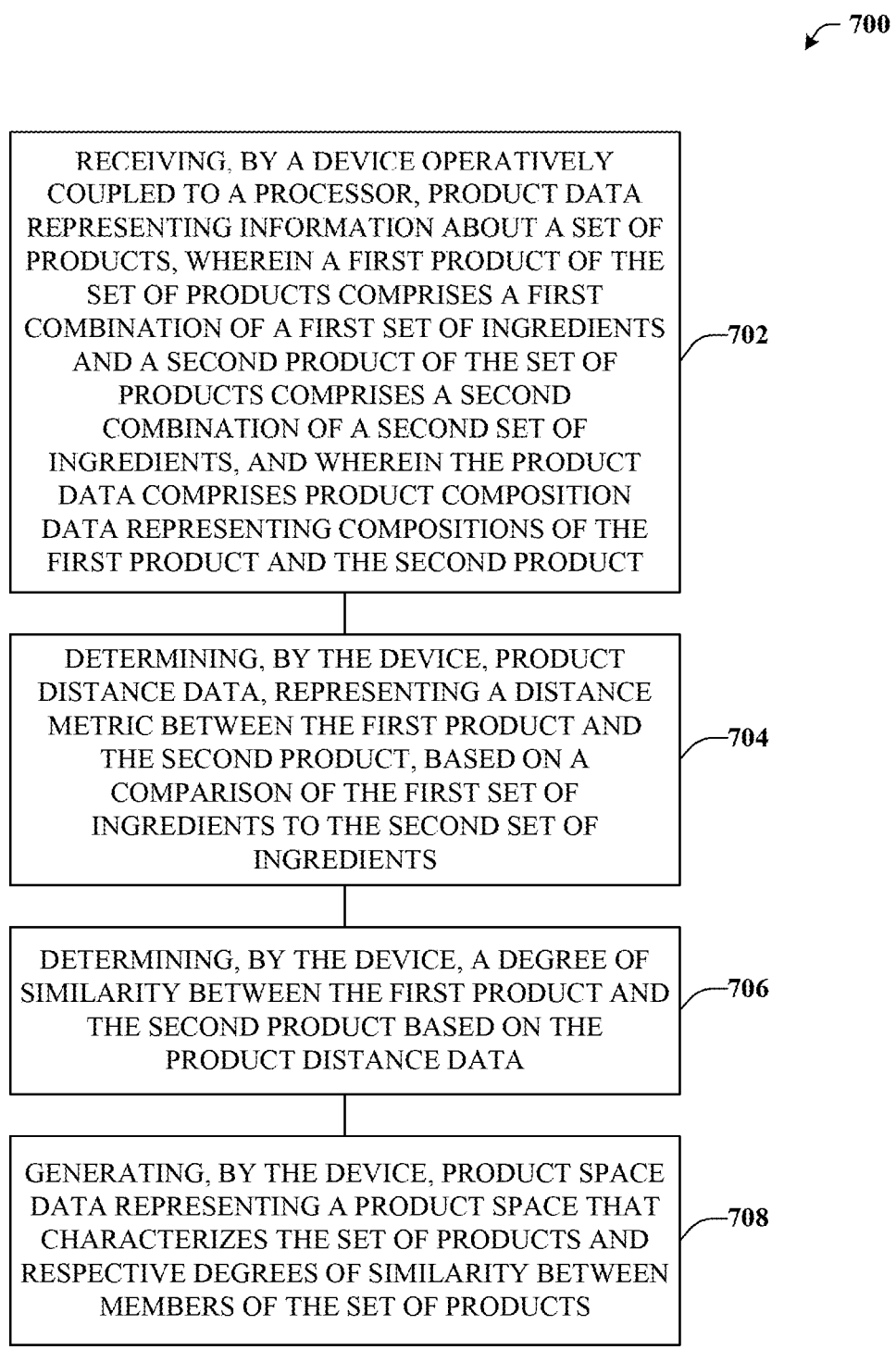
FIG. 7 illustrates a flow diagram of an example, non-limiting computer-implemented method that can improve certain products or product domains based on a data-driven model in accordance with one or more embodiments of the disclosed subject matter.
Figure 8:
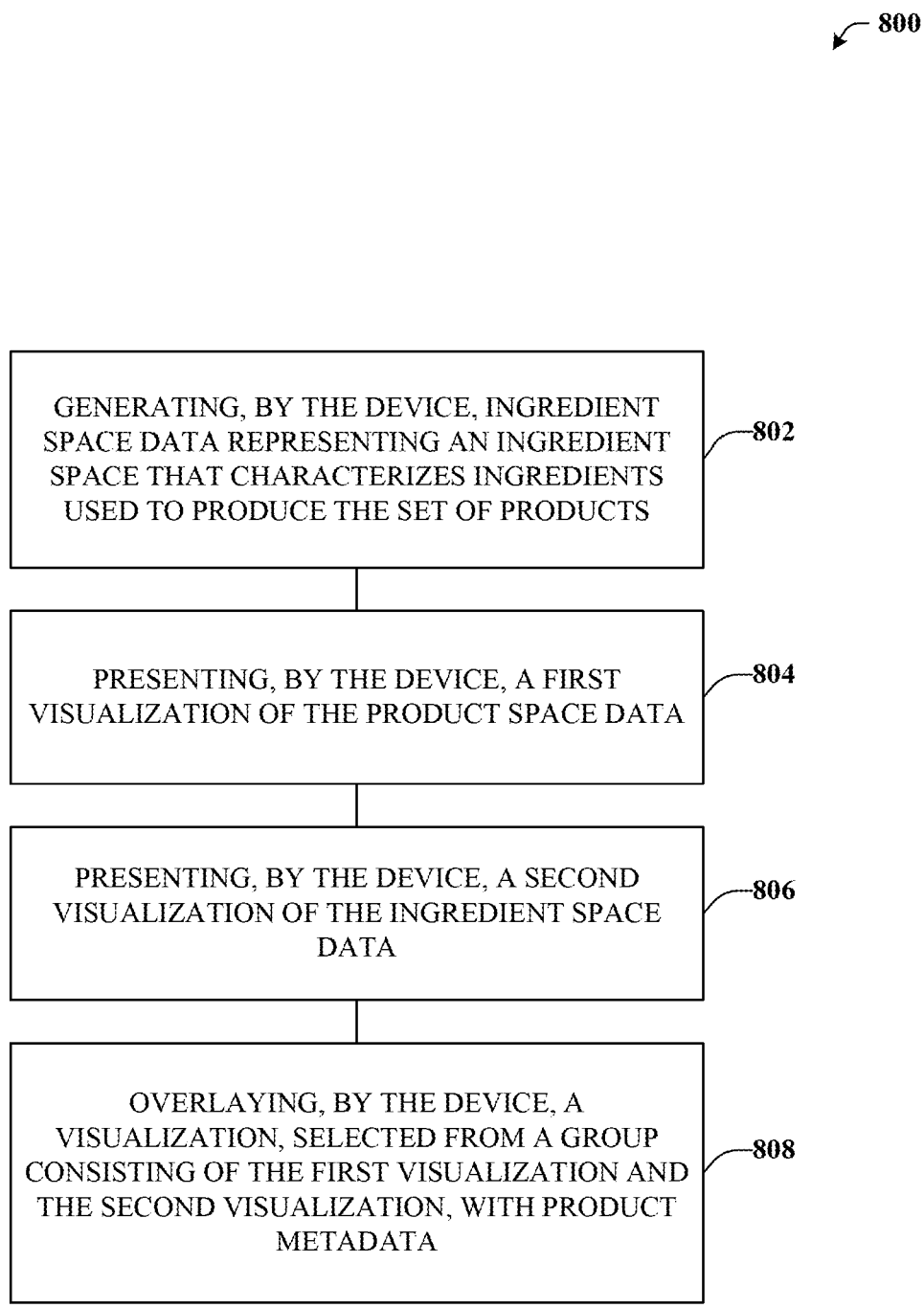
FIG. 8 illustrates a flow diagram of an example, non-limiting computer-implemented method that can generate and present visualizations relating to the product space and/or an ingredient space in accordance with one or more embodiments of the disclosed subject matter.
Figure 9:
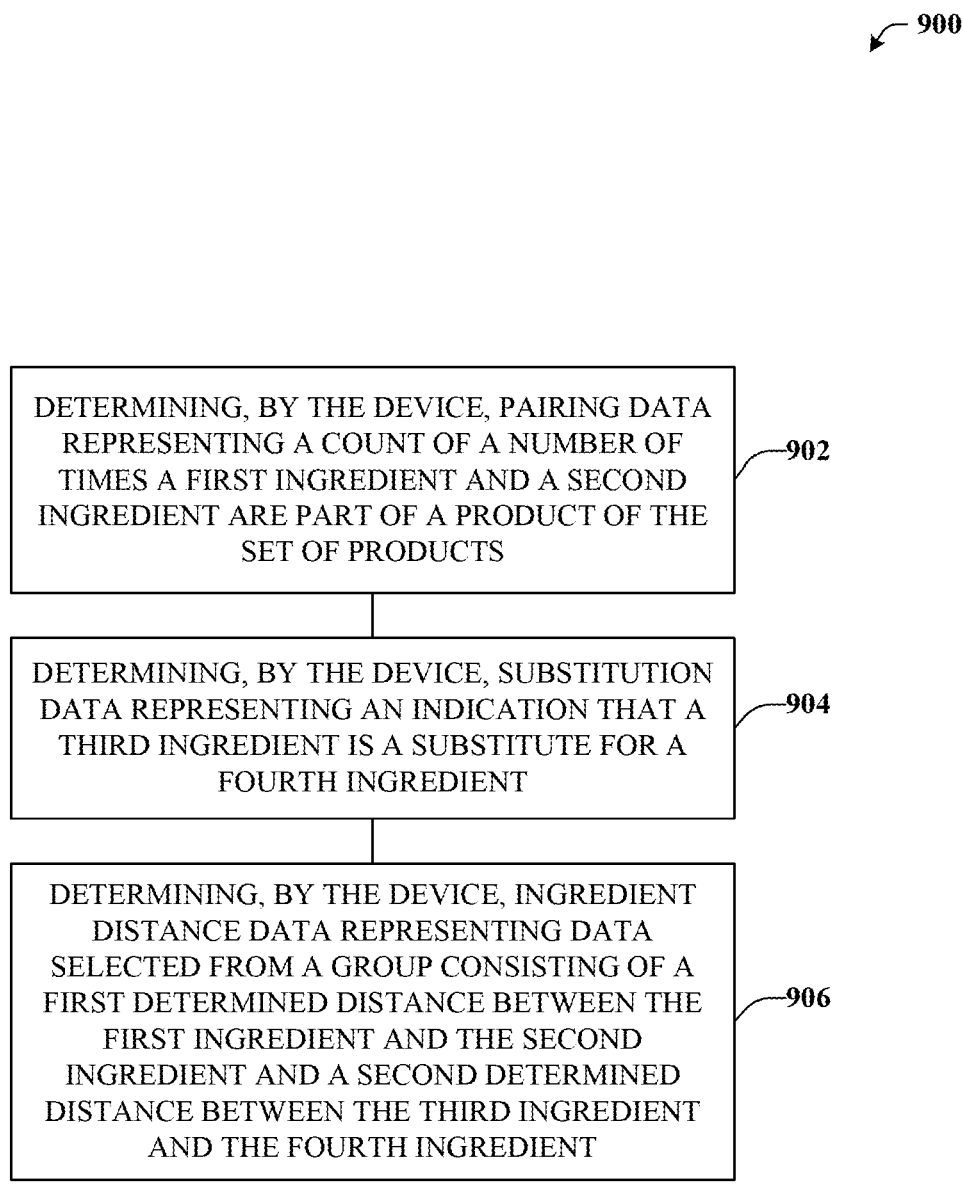
FIG. 9 illustrates a flow diagram of an example, non-limiting computer-implemented method that can provide for additional aspects or elements for improving a product based on a data-driven model in accordance with one or more embodiments of the disclosed subject matter.

FIGS. 7-9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 7 illustrates a flow diagram of an example, non-limiting computer-implemented method that can improve certain products or product domains based on a data-driven model in accordance with one or more embodiments of the disclosed subject matter. Repetitive description of like elements employed in other embodiments described herein is omitted for sake of brevity.

At reference numeral 702, a device (e.g., system 100) operatively coupled to a processor can receive product data representing information about a set of products. The set of products can comprise substantially any number of products including, for example, a first product and a second product. The first product of the set of products can comprise a first combination of a first set of ingredients. The second product of the set of products can comprise a second combination of a second set of ingredients. In some embodiments, the second set of ingredients can be the same (albeit a different combination) as the first set of ingredients. In some embodiments, the product data can comprise product composition data that can represent compositions of the first product and the second product.

At reference numeral 704, the device can determine product distance data. The product distance data can represent a distance metric between the first product and the second product. In some embodiments, the product distance data can be determined based on a comparison of the first set of ingredients to the second set of ingredients.

At reference numeral 706, the device can determine a degree of similarity between the first product and the second product. In some embodiments, the degree of similarity can be based on the product distance data.

At reference numeral 708, the device can determine product space data. In some embodiments, the product space data can represent a product space that characterizes the set of products and respective degrees of similarity between members of the set of products.

Turning now to FIG. 8, illustrated is a flow diagram of an example, non-limiting computer-implemented method that can generate and present visualizations relating to the product space and/or an ingredient space in accordance with one or more embodiments of the disclosed subject matter. Repetitive description of like elements employed in other embodiments described herein is omitted for sake of brevity.

At reference numeral 802, the device (e.g., system 100) can generate ingredient space data. In some embodiments, the ingredient space data can represent an ingredient space that characterizes ingredients used to produce the set of products. As with the product space, various ingredients of the ingredient space can be related to one another based on a distance metric (e.g., ingredient distance metric) that, e.g., can characterize a degree of similarity or dissimilarity between two ingredients.

At reference numeral 804, the device can present a first visualization of the product space data. At reference numeral 806, the device can present a second visualization of the ingredient space data. At reference numeral 808, the device can overlay a visualization with product metadata. In some embodiments, the visualization overlaid with product metadata can be selected from a group consisting of the first visualization and the second visualization.

Turning now to FIG. 9, illustrated is a flow diagram of an example, non-limiting computer-implemented method that can provide for additional aspects or elements for improving a product based on a data-driven model in accordance with one or more embodiments of the disclosed subject matter. Repetitive description of like elements employed in other embodiments described herein is omitted for sake of brevity.

At reference numeral 902, the device (e.g., system 100) can determine pairing data. In some embodiments, the pairing data can represent a count of a number of times a first ingredient and a second ingredient are part of a product of the set of products. In some embodiments, if the count is relatively high, then such can indicate that the two ingredients are similar and/or that an associated ingredient distance metric between the two ingredients is low.

At reference numeral 904, the device can determine substitution data. In some embodiments, substitution data can represent an indication that a third ingredient is a substitute for a fourth ingredient. In some embodiments, such substitution data can indicate that the two ingredients are substitutes for one another and/or that an associated ingredient distance metric between the two ingredients is low.

At reference numeral 906, the device can determine ingredient distance data. In some embodiments, ingredient distance data can represent data selected from a group consisting of a first determined distance between the first ingredient and the second ingredient and a second determined distance between the third ingredient and the fourth ingredient.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
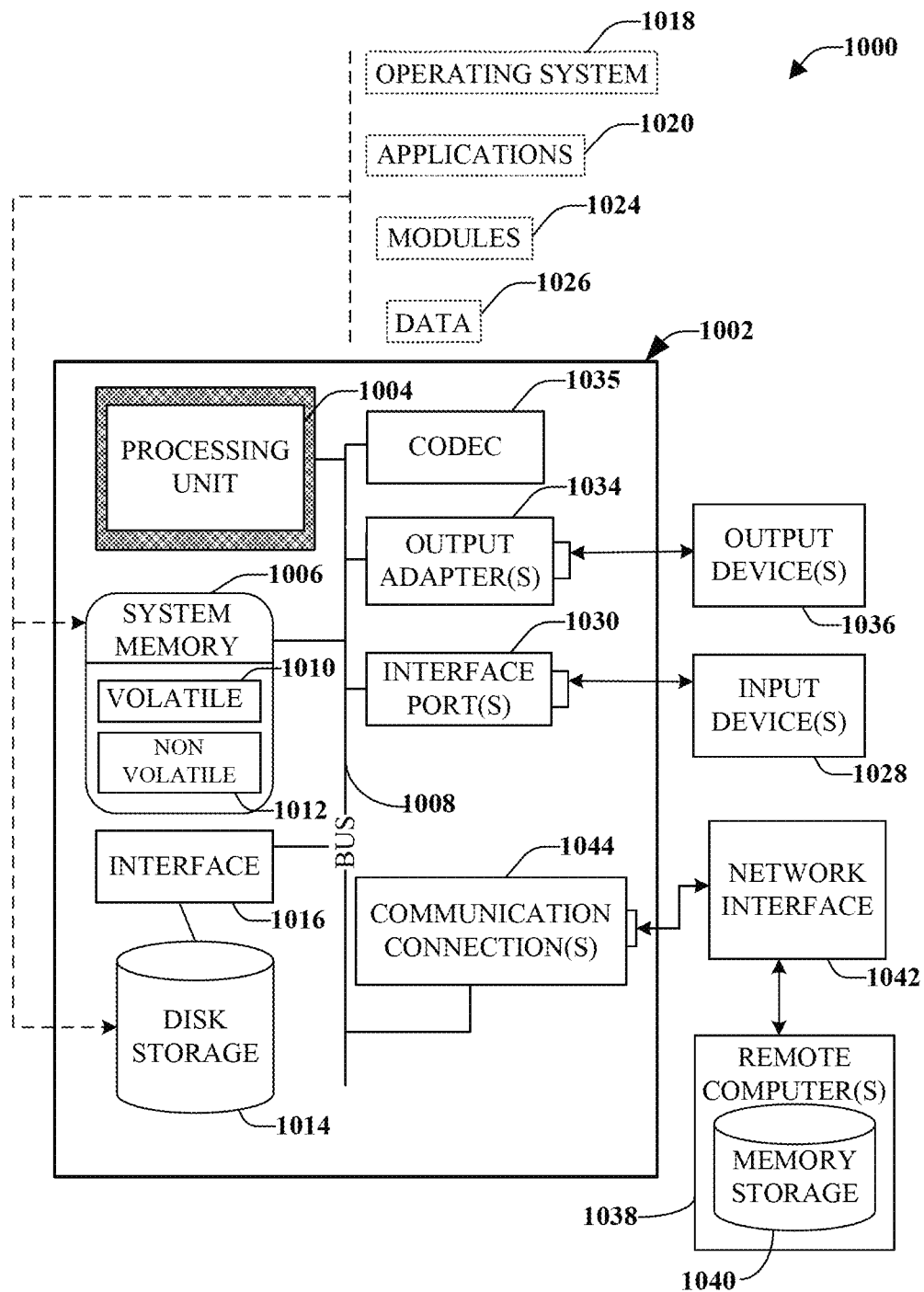
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD- ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes computer executable components stored in the memory, wherein the computer executable components comprise:
      a receiving component that receives product data representing information about a set of products, wherein a first product of the set of products comprises a first combination of a first set of ingredients, and wherein the product data comprises product composition data representing a composition of the first product based at least on the first set of ingredients; and
      a learning component that generates product space data representing a product space that characterizes the set of products based on respective numeric vectors of ingredients for products of the set of products and characterizes respective degrees of similarity between the products of the set of products based on the respective numeric vectors, wherein a degree of similarity between the first product and a second product of the set of products is determined based on product distance data representing a determined distance metric resulting from a comparison of the first set of ingredients to a second set of ingredients combined to produce the second product, wherein the learning component determines a performance metric based on the product distance data.

2. The system of claim 1, wherein the product data further comprises other data selected from a group consisting of ingredient properties data representing properties of the first set of ingredients, product metadata representing information about the first product, and expert input data representing a priori information used to adjust the product space.

3. The system of claim 1, wherein the ingredient properties data is selected from a group consisting of chemical composition of an ingredient of a product of the set of products, a taste profile of the ingredient, a flavor profile of the ingredient, an olfactory profile of the ingredient, an aural profile of the ingredient, a visual profile of the ingredient, and a solubility of the ingredient, and wherein the product metadata is selected from a group consisting of cost data representing a cost of a product of the set of products, sales information data representing sales of the product, creation time data representing a time of creation of the product, creator data representing an identity of a creator of the product, and success/failure data representing an indication of whether the product was determined to pass market testing.

4. The system of claim 1, wherein the learning component further generates ingredient space data that represents an ingredient space that characterizes ingredients used to produce the set of products.

5. The system of claim 1, further comprising a visualization component that presents a visualization of the product space data.

6. The system of claim 5, wherein the visualization depicts the determined distance metric as a numeric vector.

7. The system of claim 5, wherein the visualization depicts the first product and the second product as vertices of a graph that are connected by an edge representing the determined distance metric.

8. The system of claim 5, wherein the visualization component overlays the visualization with at least a portion of product metadata.

9. The system of claim 1, wherein the learning component:
   determines pairing data representing a count of a number of times a first ingredient and a second ingredient are part of a product of the set of products;
   determines substitution data representing an indication that a third ingredient is a substitute for a fourth ingredient; and
   determines ingredient distance data representing data selected from a group consisting of:
      a first determined distance between the first ingredient and the second ingredient; and
      a second determined distance between the third ingredient and the fourth ingredient.

10. The system of claim 9, wherein the learning component determines the product distance data based on a minimum cost of transforming the first set of ingredients to the second set of ingredients based on an earth mover's distance solution applied to the ingredient distance data corresponding to the first set of ingredients and the second set of ingredients.

11. The system of claim 1, wherein the learning component determines cluster property data, comprising:
   identifying, within the product space, a cluster of products representing a subset of the set of products that are similar based on the product distance data; and
   determining the cluster property data in response to a rule-mining algorithm applied to target data that is selected from a group consisting of the product metadata and the ingredient properties data, wherein the cluster property data represents a property that is similar amongst the cluster of products.

12. The system of claim 1, wherein the learning component determines a new product, and wherein determination of the new product comprises
   determining, based on the product distance data, that a region of the product space is sufficiently unexplored; and
   determining the new product based on combination data representing a combination of ingredients of a product, of the set of products, that is represented by a point of the region.

13. The system of claim 1, wherein the learning component determines an improvement to a product of the set of products, and wherein determination of the improvement comprises:
   selecting a first point representing the product, wherein the first vertex is in a region of the product space; and
   determining the improvement in response to examining ingredients of a related product represented by a second point in the region.

14. A computer-implemented method, comprising:
   receiving, by a device operatively coupled to a processor, product data representing information about a set of products, wherein a first product of the set of products comprises a first combination of a first set of ingredients and a second product of the set of products comprises a second combination of a second set of ingredients, and wherein the product data comprises product composition data representing compositions of the first product based at least on the first set of ingredients and the second product based at least on the second set of ingredients;
   determining, by the device, product distance data, representing a distance metric between the first product and the second product, based on a comparison of the first set of ingredients to the second set of ingredients;
   determining, by the device, a degree of similarity between the first product and the second product based on the product distance data;
   generating, by the device, product space data representing a product space that characterizes the set of products based on respective numeric vectors of ingredients for products of the set of products and characterizes respective degrees of similarity between the products of the set of products based on the respective numeric vectors; and
   determining, by the device, a performance metric based on the product distance data.

15. The computer-implemented method of claim 14, further comprising:
   generating, by the device, ingredient space data representing an ingredient space that characterizes ingredients used to produce the set of products;
   presenting, by the device, a first visualization of the product space data;
   presenting, by the device, a second visualization of the ingredient space data; and
   overlaying, by the device, a visualization, selected from a group consisting of the first visualization and the second visualization, with product metadata.

16. The computer-implemented method of claim 14, further comprising:
   determining, by the device, pairing data representing a count of a number of times a first ingredient and a second ingredient are part of a product of the set of products;

determining, by the device, substitution data representing an indication that a third ingredient is a substitute for a fourth ingredient; and determining, by the device, ingredient distance data representing data selected from a group consisting of a first determined distance between the first ingredient and the second ingredient and a second determined distance between the third ingredient and the fourth ingredient.

17. A computer program product for facilitating data driven improvements of products, the computer program product comprising a computer readable storage medium having program instructions embodied therewith, the program instructions executable by a processor to cause the processor to:

receive, by the processor, product data representing information about a set of products, wherein a first product of the set of products comprises a first combination of a first set of ingredients and a second product of the set of products comprises a second combination of a second set of ingredients, and wherein the product data comprises product composition data representing compositions of the first product based at least on the first set of ingredients and the second product based at least on the second set of ingredients;

determine, by the processor, product distance data, representing a distance metric between the first product and the second product, based on a comparison of the first set of ingredients to the second set of ingredients;

determine, by the processor, a degree of similarity between the first product and the second product based on the product distance data;

determine, by the processor, product space data representing a product space that characterizes the set of products based on respective numeric vectors of ingredients for products of the set of products and characterizes respective degrees of similarity between the products of the set of products based on the respective numeric vectors; and determining, by the processor, a performance metric based on the product distance data.

18. The computer program product of claim 17, wherein the program instructions are further executable by the processor to cause the processor to:

determine, by the processor, pairing data representing a count of a number of times a first ingredient and a second ingredient are part of a product of the set of products;

determine, by the processor, substitution data representing an indication that a third ingredient is a substitute for a fourth ingredient; and determining, by the processor, ingredient distance data representing data selected from a group consisting of a first determined distance between the first ingredient and the second ingredient and a second determined distance between the third ingredient and the fourth ingredient.

19. The computer program product of claim 17, wherein the program instructions are further executable by the processor to cause the processor to:

determine, within the product space, by the processor, a cluster of products representing a subset of the set of products that are similar based on the product distance data;

determine, by the processor, cluster property data in response to a rule-mining algorithm applied to target data that is selected from a group consisting of the product metadata and the ingredient properties data, wherein the cluster property data represents a property that is similar amongst the cluster of products;

determine, by the processor, that a region of the product space is sufficiently unexplored based on the product distance data; and determine, by the processor, a new product in response to combination data representing a combination of ingredients of a product, of the set of products, that is represented by a vertex of the region.

20. The computer program product of claim 17, wherein the program instructions are further executable by the processor to cause the processor to present a visualization of the product space data.

* * * * *